US010266223B2

(12) United States Patent
Shinde et al.

(10) Patent No.: US 10,266,223 B2
(45) Date of Patent: Apr. 23, 2019

(54) ELECTRIC-POWERED VEHICLE

(71) Applicant: AISIN SEIKI KABUSHISIKI KAISHA, Kariya-shi, Aichi-ken (JP)

(72) Inventors: Yoshihiro Shinde, Kariya (JP); Yuya Nishi, Toyota (JP); Peter Marco, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/554,336

(22) PCT Filed: Dec. 24, 2015

(86) PCT No.: PCT/JP2015/086013
§ 371 (c)(1),
(2) Date: Aug. 29, 2017

(87) PCT Pub. No.: WO2016/139869
PCT Pub. Date: Sep. 9, 2016

(65) Prior Publication Data
US 2018/0037289 A1 Feb. 8, 2018

(30) Foreign Application Priority Data
Mar. 2, 2015 (JP) ................... 2015-040427

(51) Int. Cl.
B62K 5/027 (2013.01)
B62B 3/00 (2006.01)
B62B 3/02 (2006.01)
B62K 17/00 (2006.01)
(Continued)

(52) U.S. Cl.
CPC ............... B62K 5/027 (2013.01); B62B 3/00 (2013.01); B62B 3/02 (2013.01); B62B 3/027 (2013.01);
(Continued)

(58) Field of Classification Search
CPC .. B62K 5/027; B62B 3/00; B62B 3/02; B62B 3/027
See application file for complete search history.

(56) References Cited

U.S. PATENT DOCUMENTS 4,874,055 A * 10/1989 Beer ..................... B62B 5/0026
180/19.2
7,537,076 B2 * 5/2009 Falkiner ................. A63B 55/57
180/208

(Continued)

FOREIGN PATENT DOCUMENTS

CN 202029972 11/2011
JP 10-230879 9/1998
(Continued)

OTHER PUBLICATIONS

Extended European Search Report in Application No. EP 15 88 4035 dated Feb. 20, 2018.

Primary Examiner — Faye M Fleming
(74) Attorney, Agent, or Firm — Finnegan, Henderson, Farabow, Garrett & Dunner, LLP

(57) ABSTRACT

An electric-powered vehicle includes a drive wheel and a coasting wheel. The drive wheel and the coasting wheel are spaced apart from each other in a vehicle traveling direction. A frame is arranged between the drive wheel and the coasting wheel and rotationally supports the drive wheel and the coasting wheel. The frame has an object mounting portion. A stay is coupled to the frame and extends upward from the frame. A seat and a handlebar are supported by the stay. The vehicle has a plurality of modes including a ride mode, in which a user uses the vehicle while being seated on the seat and holding the handlebar, and a cart mode, in which the user uses the vehicle while standing on the ground and holding the handlebar. The vehicle is selectively switched to a shape corresponding to each of the modes.

7 Claims, 3 Drawing Sheets

(51) Int. Cl.
    *B62B 5/00*     (2006.01)
    *B62D 51/04*     (2006.01)
    *B62K 15/00*     (2006.01)
    *B62M 6/65*     (2010.01)
    *B62K 3/00*     (2006.01)
    *B62K 5/05*     (2013.01)
    *B62K 7/04*     (2006.01)
    *B62K 13/00*     (2006.01)

(52) U.S. Cl.
    CPC ............ *B62B 5/0033* (2013.01); *B62D 51/04* (2013.01); *B62K 3/002* (2013.01); *B62K 5/05* (2013.01); *B62K 7/04* (2013.01); *B62K 13/00* (2013.01); *B62K 15/006* (2013.01); *B62K 17/00* (2013.01); *B62M 6/65* (2013.01)

(56) References Cited

U.S. PATENT DOCUMENTS

| | | | |
|---|---|---|---|
| 9,339,431 B2 * | 5/2016 | Menard | .................. A61H 3/04 |
| 2001/0013435 A1 | 8/2001 | Ono | |
| 2009/0277700 A1 * | 11/2009 | Falkiner | ................ B62K 5/027 |
| | | | 180/19.3 |
| 2018/0022412 A1 * | 1/2018 | Etzelsberger | ........ B60K 7/0007 |

FOREIGN PATENT DOCUMENTS

| | | |
|---|---|---|
| JP | 3395007 | 4/2003 |
| JP | 2005-28991 | 2/2005 |
| JP | 2014-73806 | 4/2014 |
| WO | WO 93/01788 | 2/1993 |

* cited by examiner

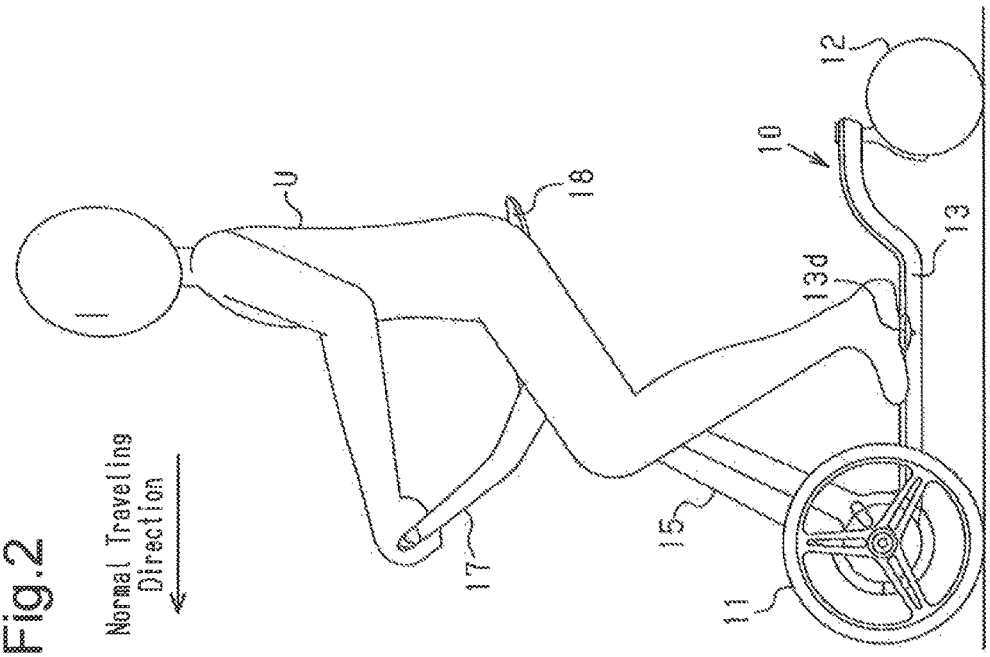
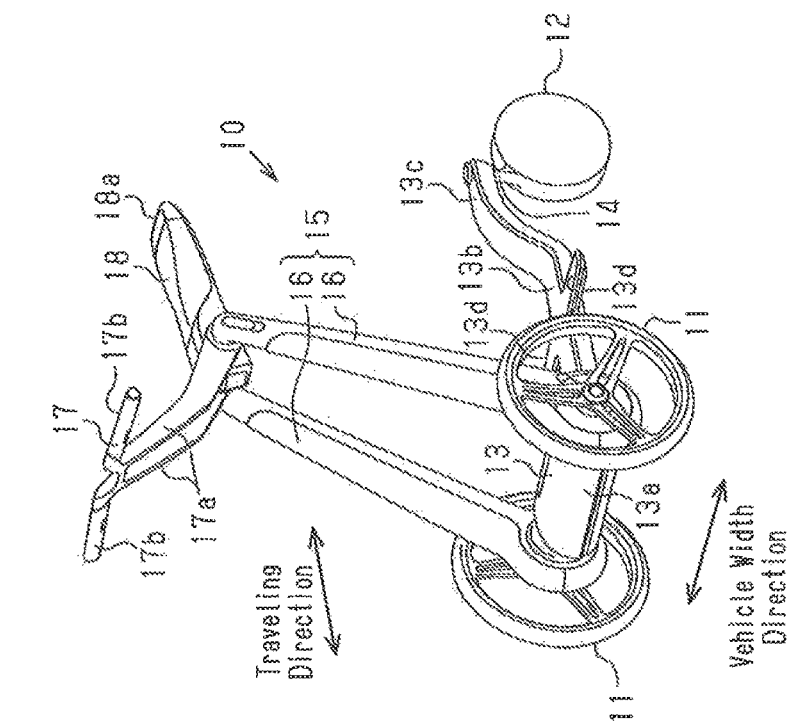

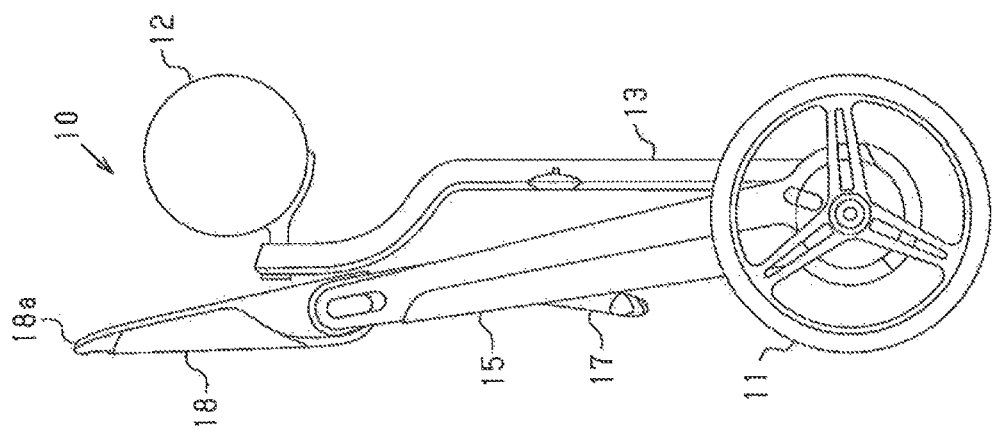
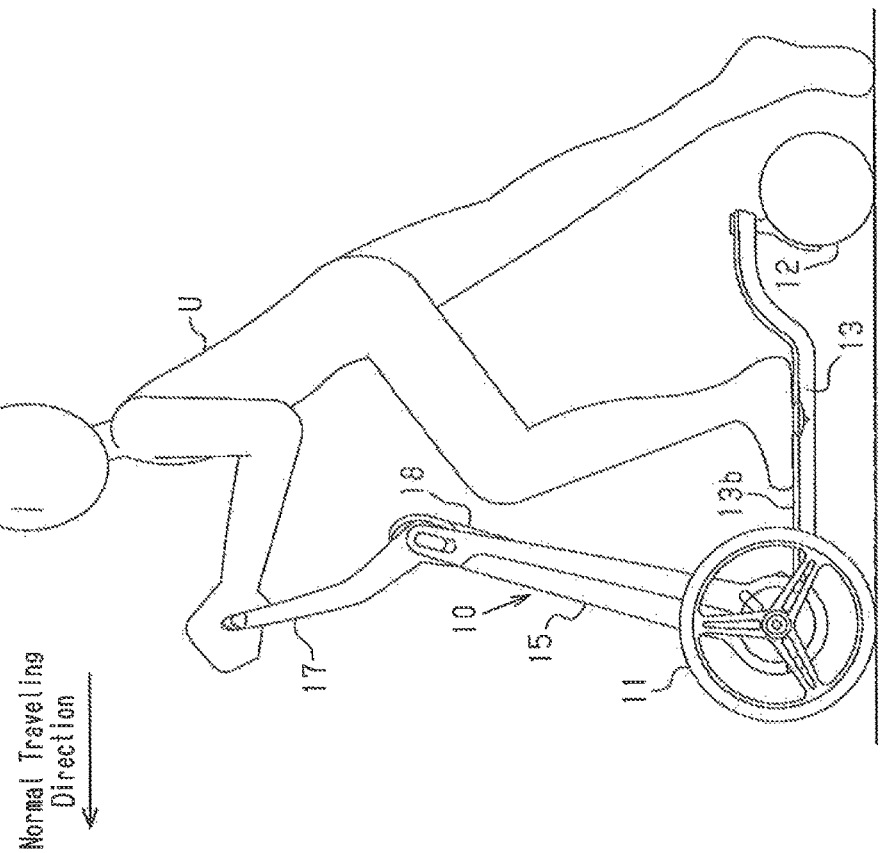
Fig.4
Fig.5

ELECTRIC-POWERED VEHICLE

CROSS-REFERENCE TO RELATED APPLICATIONS

This application is a national phase application of International Application No. PCT/JP2015/086013, filed Dec. 24, 2015, and claims the priority of Japanese Application No. 2015-040427, filed Feb. 3, 2015, the content of both of which is incorporated herein by reference.

TECHNICAL FIELD

The present invention relates to an electric-powered vehicle.

BACKGROUND ART

For example, an electric-powered vehicle described in Patent Document 1 includes a drive wheel, a coasting wheel, a body frame, a seat a foot rest portion, and an arched handlebar. The drive wheel and the coasting wheel are arranged to be spaced apart from each other in the traveling direction. The body frame rotationally supports the drive wheel and the coasting wheel. The seat is arranged above the drive wheel. The foot rest portion is arranged between the drive wheel and the coasting wheel. The handlebar is pivotal about an axis extending in the vehicle width direction. By pivoting the handlebar, the user is allowed to use the electric-powered vehicle in a sit-down state, which is a state in which the user is seated on the seat, and also in a stand-up state, which is a state in which the user stands upright on the foot rest portion while facing the seat.

PRIOR ART DOCUMENT

Patent Document

Patent Document Japanese Laid-Open Patent Publication No. 2014-73806

SUMMARY OF THE INVENTION

Problems that the Invention is to Solve

The electric-powered vehicle of Patent Document 1 has the foot rest portion for receiving the feet of the user but the foot rest portion is not designed, to carry an object mounted on the foot rest portion.

Accordingly, it is an objective of the present invention to provide an electric-powered vehicle that is usable in a sit-down state, which is a state in which the user is seated on a seat, and is also usable as a cart.

Means for Solving the Problems

To achieve the foregoing objective and in accordance with one aspect of the present invention, an electric-powered vehicle is provided that includes a drive wheel, a coasting wheel, a frame, a stay, a seat, and a handlebar. The drive wheel and coasting wheel are arranged to be spaced apart from each other in a traveling direction of the electric-powered vehicle. The frame is arranged between the drive wheel and the coasting wheel and configured to rotationally support the drive wheel and the coasting wheel. The frame has an object mounting portion. The stay is coupled to the frame and extends upward from the frame. The seat is supported by the stay. The handlebar is supported by the stay. The electric-powered vehicle has a plurality of modes including a ride mode, in which a user uses the electric-powered vehicle while being seated on the seat and holding the handlebar, and a cart mode, in which the user uses the electric-powered vehicle while standing on the ground and holding the handlebar. The electric-powered vehicle is configured to be selectively switched to a shape corresponding to each of the modes.

BRIEF DESCRIPTION OF THE DRAWINGS

FIG. 1 is a perspective view showing the configuration of an electric-powered vehicle according to one embodiment.

FIG. 2 is a side view showing the shape of the electric-powered vehicle of FIG. 1 and the posture of the user in a ride mode.

FIG. 4 is a side view showing the shape of the electric-powered vehicle of FIG. 1 and the posture of the user in a Kickboard (trademark) mode.

FIG. 5 is a side view showing the shape of the electric-powered vehicle of FIG. 1 in a folding mode.

MODES FOR CARRYING OUT THE INVENTION

Figure 3:
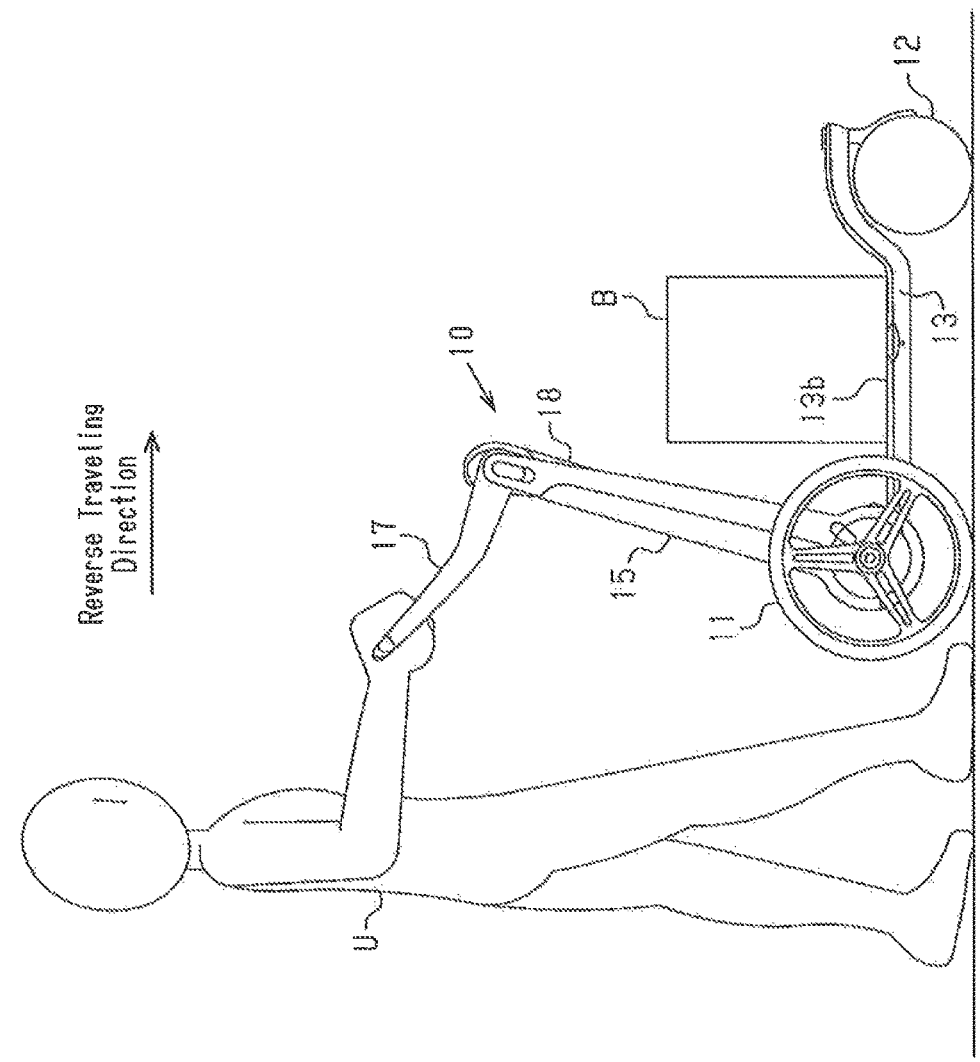
FIG. 3 is a side view showing the shape of the electric-powered vehicle of FIG. 1 and the posture of the user in a cart mode.

An electric-powered vehicle 10 according to one embodiment will now be described.

As shown in FIG. 1, the electric-powered vehicle 10 includes two drive wheels 11 and one coasting wheel 12, which are arranged to be spaced apart from each other in the traveling direction (the front-rear direction) of the electric-powered vehicle 10. The drive wheels 11 are spaced apart from each other in the vehicle width direction. The axis of the drive wheels 11 extends in the vehicle width direction. The electric-powered vehicle 10 also includes a frame 13, which is arranged between the two drive wheels 11 and the coasting wheel 12. The frame 13 rotationally supports the drive wheels 11 and the coasting wheel 12. By rotating the drive wheels 11 at different rotation speeds, the electric-powered vehicle 10 is turned. The frame 13 has a substantially tubular holder portion 13a, which extends in the vehicle width direction. The holder portion 13a accommodates one or more electric motors (not shown), which drive and rotate the drive wheels 11.

The frame 13 also has a substantially cross-shaped plate-like object mounting portion 13b, which extends in the traveling direction between the holder portion 13a and the coasting wheel 12. The object mounting portion 13b is substantially parallel to the ground. The object mounting portion 13b has two foot rest portions 13d, which extend toward the opposite sides in the vehicle width direction.

The frame 13 further has a support portion 13c, which is connected to the distal end. (the rear end) of the object mounting portion 13b. The support portion 13c is curved to rise as the distance from the object mounting portion 13b increases. A bearing member 14 is arranged at the distal end of the support portion 13c. The bearing member 14 is pivotal about a turning axis, which extends in the vertical direction, relative to the frame 13. The frame 13 rotationally supports the coasting wheel 12 through the bearing member 14. By rotating the bearing member 14 about the turning axis, the electric-powered vehicle 10 is turned.

The electric-powered vehicle 10 includes a stay 15, which is coupled to the frame 13 and extends upward from the frame 13. Specifically, the stay 15 includes two arm portions 16, which are pivotally coupled to the opposite ends of the holder portion 13a. Each of the arm portions 16 extends upward from a position between the corresponding one of the drive wheels 11 and the holder portion 13a. Each arm portion 16 is pivotal about the axis of the corresponding drive wheel 11. The arm portions 16 are inclined toward each other in the vehicle width direction in an upward direction. A handlebar 17 is supported by the upper ends of the arm portions 16 while being arranged between the two arm portions 16. The handlebar 17 is pivotal about an axis extending in the vehicle width direction. The handlebar 17 has two extended portions 17a and two holding portions 17b. The extended portions 17a are extended from the upper ends of the arm portions 16. The holding portions 17b project away from each other from the distal ends of the extended portions 17a in the vehicle width directions. The distal ends of the extended portions 17a are connected to each other in the vehicle width direction.

A substantially saddle-like seat 18 is supported by the upper ends of the two arm portions 16 while being arranged between the two extended portions 17a of the handlebar 17. The seat 18 is pivotal about an axis extending in the vehicle width direction. The distal end of the seat 18 has an opening that opens in the thickness direction of the seat 18. The section around the opening forms a grip portion 18a. The opening may be formed by either a dent or a through-hole.

A direction input device or manipulation device (not shown) such as a joystick is arranged in one of the holding portions 17b of the handlebar 17. The direction input device is electrically connected to an electronic control unit (not shown), which is arranged at a suitable position in the electric-powered vehicle 10. The direction input device outputs a manipulation signal corresponding to manipulation of the direction input device by the user U to the electronic control unit. The electronic control unit is electrically connected to the above-described electric motors and drives and controls the electric motors in correspondence with the manipulation signal from the direction input device. That is, the electronic control unit controls traveling of the electric-powered vehicle 10 by controlling rotation of the two drive wheels 11 through driving and controlling of the electric motors. For example, by rotating the electric motors normally, the electronic control unit causes the electric-powered vehicle 10 to advance such that the drive wheels 11 precede the coasting wheel 12. The direction in which the electric-powered vehicle 10 travels at this time will hereafter be referred to as "the normal traveling direction". In contrast, by rotating the electric motors reversely, the electronic control unit causes the electric-powered vehicle. 10 to advance such that the drive wheels 11 follow the coasting wheel 12. The direction in which ice electric-powered vehicle 10 travels at this time will hereafter be referred to as "the reverse traveling direction".

By changing the angle of at least one of the frame 13, the seat 18, and the handlebar 17 with respect to the stay 15, the electric-powered vehicle 10 is switchable selectively among multiple modes in correspondence with the purpose of use by the user U. In other words, the shape of the electric-powered vehicle 10 is changeable selectively to a shape corresponding to each of the multiple modes. The multiple modes (the multiple shapes) will hereafter be described.

A first mode of the modes is a ride mode used by the user U in a sit-down state. As shown in FIG. 2, in the ride mode, the stay 15 extends upward while being inclined in the reverse traveling direction with the handlebar 17 extending upward while being inclined in the normal traveling direction. The seat 16 extends in the reverse traveling direction from the upper end of the stay 15. In the ride mode, the user U is in a posture in which the user U faces in the normal traveling direction, is seated on the seat 18, and holds the handlebar 17 with the stay 15 located between the legs in the vehicle width direction and the soles of the feet resting on the two foot rest portions 13d. This allows the user U to electrically move the electric-powered vehicle 10 in a sit-down state on the electric-powered vehicle 10. The stay 15 is located on the leading side of the object mounting portion 13b in the traveling direction in the ride mode (the normal traveling direction).

A second mode of the modes is a cart mode, in which the electric-powered vehicle 10 is used as a cart. With reference to FIG. 3, in the cart mode, the stay 15 extends upward while being inclined in the reverse traveling direction by a smaller angle with respect to the vertical direction than in the ride mode. The seat 18 extends downward along the stay 15. In the cart mode, the user U is in a posture in which the user U faces in the reverse traveling direction, stands upright, and holds the handlebar 17 at a position on the trailing side of the electric-powered vehicle 10 in the reverse traveling direction. This allows the user U to move the electric-powered vehicle 10 by human power with an object B mounted on the object mounting portion 13b. The traveling direction in the cart mode (the reverse traveling direction) is reverse to the traveling direction in the ride mode (the normal traveling direction). Also, in the cart mode, the two drive wheels 11 may be driven by manipulating the direction input device to energize the electric motors. This reduces the load on the user U caused by carrying a heavy object.

A third mode of the modes is a Kickboard (trademark) mode. As illustrated in FIG. 4, in the Kickboard mode, the stay 15 extends upward while being inclined in the reverse traveling direction by a smaller angle with respect to the vertical direction than in the ride mode. Also, the handlebar 17 extends upward while being inclined in the normal traveling direction by a larger angle with respect to the horizontal direction than in the ride mode. The seat 18 extends downward along the stay 15. In the Kickboard mode, the user U is in a posture in which she user U faces in the normal traveling direction and holds the handlebar 17 with one of the feet on the ground and the other on the object mounting portion 13b. This allows the user U to move by human power while kicking the ground with the foot. For the Kickboard mode, it is a preferable that the electric-powered vehicle 10 have a suitable lock mechanism that is capable of manually or electrically locking the bearing member 14 against rotation about the turning axis to fix the axis of the coasting wheel 12 in the direction coinciding with the vehicle width direction.

A fourth mode of the modes is a folding mode. Referring to FIG. 5, in the folding mode, the electric-powered vehicle 10 is folded down such that the frame 13 and the stay 15 are overlapped with each other. The handlebar 17 extends toward the drive wheels 11 along the stay 15. The seat 18 extends away from the drive wheels 11 in the direction in which the stay 15 extends. This allows the user U to carry the electric-powered vehicle 10 while gripping the grip portion 18a and rolling the drive wheels 11.

The present embodiment achieves the following advantages.

(1) In the present embodiment, the user U is allowed to use the electric-powered vehicle 10 as an electrically operated vehicle by taking the posture of being seated on the seat 18 while holding the handlebar 17 in the ride mode. Also, the user U is allowed to mount and carry the object B on the object mounting portion 13b, in other words, use the electric powered vehicle 10 as a cart, by taking the posture of standing on the ground without being seated on the seat 18 while holding the handlebar 17 in the cart mode.

(2) In the present embodiment, the stay 15 is located on the leading side of the object mounting portion 13b in the traveling direction in the ride mode (the normal traveling direction). The traveling direction in the cart mode (the reverse traveling direction) is set reverse to the traveling direction in the ride mode. That is, the stay 15 is located on the trailing side of the object mounting portion 13b in the traveling direction in the cart mode. The user U is thus allowed, to hold the handlebar 17 on the further trailing side of the stay 15 in the traveling direction in the cart mode. This ensures a comparatively large space for the object mounting portion 13b, which is located on the leading side of the stay 15 in the traveling direction in the cart mode. Further, if, in the cart mode, the user U needs to be in a posture holding the handlebar 17 while stretching his(her) arms over the object mounting portion 13h, for example, the stay 15 or the handlebar 17 needs to be extended or inclined toward the user. However, in the present embodiment, such extending or inclining of the stay 15 or the handlebar 17 is unnecessary.

For example, if the stay 15 needs to be inclined toward the user U to an excessive extent, the stay 15 is likely to interfere with the object B on the object mounting portion. 13b or limitation is set on the height of the object B mounted on the object mounting portion 13b. However, the present embodiment restrains the above-described interference or relaxes the limitation on the height.

(3) In the present embodiment, the stay 15 extends upward from the frame 13 at the positions corresponding to the drive wheels 11. The weight of the user U seated on the seat 18 is thus easily applied to the drive wheels 11. This facilitates transmission of the drive force of the drive wheels 11 to the ground.

(4) In the present embodiment, of the drive wheels 11 and the coasting wheel 12, the drive wheels 11 are located on the leading side in the traveling direction in the ride mode (the normal traveling direction), and the drive wheels 11 have a larger diameter than the coasting wheel 12, which is located on the trailing side. As a result, when traveling in the ride mode, the wheels on the leading side in the traveling direction (the drive wheels 11), each of which has the large diameter, smoothly get over uneven spots such as bumps and dips on the ground surface such as steps.

(5) In the present embodiment, the drive wheels 11 are located on the trailing side of the object mounting portion 13b in the traveling direction in the cart mode. For a case in which the electric powered vehicle 10 is moved by human power, the drive wheels 11 are configured to, in a state in which the electric motors are not energized, rotate basically at equal speeds to cause the electric-powered vehicle 10 to advance in a straight line. However, in the cart mode, due to the fact that the coasting wheel 12, which is located on the leading side of the two drive wheels 11 in the traveling direction, are rotational about the turning axis, the user U is allowed to smoothly turn the electric-powered vehicle 10.

(6) in the present embodiment, by changing the angle of at least one of the frame 13, the seat 18, and the handlebar 17 with respect to the stay 15, the shape of the electric-powered vehicle 10 is modified to utilizes the cart mode, in which the user U is allowed to easily carry an object B or that a large-sized object B can be mounted on the electric-powered vehicle 10.

In the cart mode, the object B can be carried by moving the electric-powered vehicle 10 electrically or by human power. Particularly, in a case in which the electric-powered vehicle 10 is moved by human power, the object B is carried without consuming electric power.

(7) In the present embodiment, by changing the angle of at least one of the frame 13, the seat 18, and the handlebar 17 with respect to the stay 15, the electric-powered vehicle 10 is switched selectively among the four types of modes, which are the ride mode, the cart mode, the Kickboard mode, and the folding mode. This ensures efficient movement corresponding to the purpose of use.

The above-described embodiment may be modified as follows.

In the above-described embodiment, the electric-powered vehicle 10 may be used by the user U in the posture standing upright on the foot rest portions 13d, which is a stand-up posture, in the ride mode.

In the above-described embodiment, the drive wheels 11 and the coasting wheel 12 may have substantially equal diameters. Alternatively, the coasting wheel 12 may have a larger diameter than the drive wheels 11.

In the above-described embodiment, the stay 15 may extend upward from the frame 13 at a position corresponding to the coasting wheel 12.

In the above-described embodiment, the ride mode and the cart mode may employ the same traveling direction.

In the above-described embodiment, two coasting wheels 12, not the single coasting wheel 12, may be employed. In this case, the coasting wheels 12 may be arranged to be spaced apart from each other in the vehicle width direction.

In the above-described embodiment, the seat 18 extends downward along the stay 15 in the cart mode. However, the invention is not restricted to this. The seat 18 may extend in the reverse traveling direction from the upper ends of the arm portions 16 as in the ride mode.

The invention claimed is:

1. An electric-powered vehicle comprising:
    two drive wheels and a coasting wheel, which are arranged to be spaced apart from each other in a traveling direction of the electric-powered vehicle;
    a frame, which is arranged between the drive wheels and the coasting wheel and configured to rotationally support the drive wheels and the coasting wheel, wherein the frame has an object mounting portion;
    a stay, which is coupled to the frame and extends upward from the frame;
    a seat, which is supported by the stay; and
    a handlebar, which is supported by the stay, wherein
    the electric-powered vehicle has a plurality of modes including a ride mode, in which a user uses the electric-powered vehicle while being seated on the seat and holding the handlebar, and a cart mode, in which the user uses the electric-powered vehicle while standing on the ground and holding the handlebar,
    the electric-powered vehicle is configured to be selectively switched to a shape corresponding to each of the modes,
    the stay is located on a leading side of the object mounting portion in the traveling direction of the electric-powered vehicle in the ride mode,
    the traveling direction of the electric-powered vehicle in the cart mode is set to be reverse to the traveling direction of the electric-powered vehicle in the ride mode,
    the two drive wheels are spaced apart from each other in a width direction of the electric-powered vehicle and located on a leading side of the coasting wheel in the traveling direction of the electric-powered vehicle in the ride mode, and the coasting wheel is rotational about a turning axis, which extends in a vertical direction, relative to the frame and located on a leading side of the two drive wheels in the traveling direction of the electric-powered vehicle in the cart mode.

2. The electric-powered vehicle according to claim 1, wherein the stay extends upward from the frame at a position corresponding to the drive wheels.

3. The electric-powered vehicle according to claim 1, wherein each of the drive wheels has a larger diameter than the coasting wheel.

4. The electric-powered vehicle according to claim 1, wherein the electric-powered vehicle is configured to be switched to a shape corresponding to each of the modes by changing an angle of at least one of the frame, the seat, and the handlebar with respect to the stay.

5. The electric-powered vehicle according to claim 1, wherein the frame has a substantially tubular holder portion, which extends in the width direction of the electric-powered vehicle, the stay includes two arm portions, which are pivotally coupled to the opposite ends of the holder portion, and the handlebar and the seat are supported by upper ends of the two arm portions and pivotal about an axis extending in the width direction of the electric-powered vehicle.

6. The electric-powered vehicle according to claim 5, wherein the handlebar is arranged between the two arm portions and includes two extended portions extended from the upper ends of the two arm portions, and the seat is arranged between the two extended portions.

7. The electric-powered vehicle according to claim 1, wherein the coasting wheel is rotationally supported by the frame through a single bearing member, which is rotational about the turning axis relative to the frame.

* * * * *